(12) United States Patent
Tsuchiya

(10) Patent No.: US 12,179,406 B2
(45) Date of Patent: Dec. 31, 2024

(54) PREFORM, RESIN-MADE CONTAINER, AND MANUFACTURING METHOD THEREFOR

(71) Applicant: NISSEI ASB MACHINE CO., LTD., Nagano (JP)

(72) Inventor: Yoichi Tsuchiya, Nagano (JP)

(73) Assignee: NISSEI ASB MACHINE CO., LTD., Nagano (JP)

(*) Notice: Subject to any disclaimer, the term of this patent is extended or adjusted under 35 U.S.C. 154(b) by 302 days.

(21) Appl. No.: 17/617,625

(22) PCT Filed: Jun. 12, 2020

(86) PCT No.: PCT/JP2020/023283
§ 371 (c)(1),
(2) Date: Dec. 9, 2021

(87) PCT Pub. No.: WO2020/251035
PCT Pub. Date: Dec. 17, 2020

(65) Prior Publication Data
US 2022/0234272 A1 Jul. 28, 2022

(30) Foreign Application Priority Data

Jun. 12, 2019 (JP) ................. 2019-109558

(51) Int. Cl.
*B29C 49/06* (2006.01)
*B29C 45/14* (2006.01)
(Continued)

(52) U.S. Cl.
CPC .............. *B29C 49/06* (2013.01); *B29C 45/14* (2013.01); *B29C 45/27* (2013.01);
(Continued)

(58) Field of Classification Search
CPC .................... B29C 49/6427; B29C 45/1684
See application file for complete search history.

(56) References Cited

U.S. PATENT DOCUMENTS 5,443,766 A 8/1995 Slat et al.
5,464,106 A 11/1995 Slat et al.
(Continued)

FOREIGN PATENT DOCUMENTS

BE 850 215 A 7/1977
CA 1073831 A 3/1980
(Continued)

OTHER PUBLICATIONS

Notification of Reasons for Revocation issued in Japanese Patent Application No. 2021-505789 dated Oct. 11, 2022, along with English translation thereof.
(Continued)

*Primary Examiner* — Nahida Sultana
*Assistant Examiner* — Virak Nguon
(74) *Attorney, Agent, or Firm* — GREENBLUM & BERNSTEIN, P.L.C.

(57) ABSTRACT

A preform including: an opening portion; a body portion; and a bottom portion, the preform having a two-layer structure in which the body portion and the bottom portion include an inner layer made of a virgin material and an outer layer made of a recycled material, in which a weight ratio of the recycled material to a total weight of the preform is 50% by weight or more, a ratio of a thickness of the outer layer to a thickness of the inner layer in the body portion is 1.5 or more, and a haze of a body portion of a container molded from the preform is 1.8% or less.

14 Claims, 11 Drawing Sheets

(51) Int. Cl.
   *B29C 45/27*   (2006.01)
   *B29C 49/64*   (2006.01)
   *B65D 1/02*    (2006.01)
   *B29K 67/00*   (2006.01)

(52) U.S. Cl.
   CPC ........ *B29C 49/6427* (2013.01); *B65D 1/0261* (2013.01); *B29K 2067/003* (2013.01)

(56) References Cited

U.S. PATENT DOCUMENTS

| | | | |
|---|---|---|---|
| 5,645,183 | A | 7/1997 | Slat et al. |
| 5,674,448 | A | 10/1997 | Slat et al. |
| 5,676,267 | A | 10/1997 | Slat et al. |
| 5,688,572 | A | 11/1997 | Slat et al. |
| 5,712,009 | A | 1/1998 | Moore et al. |
| 6,312,641 | B1 | 11/2001 | Hutchinson et al. |
| 6,352,426 | B1 | 3/2002 | Hutchinson et al. |
| 6,391,408 | B1 | 5/2002 | Hutchinson et al. |
| 2002/0090473 | A1 | 7/2002 | Lee et al. |
| 2003/0001315 | A1 | 1/2003 | Hutchinson et al. |
| 2003/0012904 | A1 | 1/2003 | Hutchinson et al. |
| 2003/0219555 | A1 | 11/2003 | Hutchinson et al. |
| 2004/0247735 | A1 | 12/2004 | Hutchinson et al. |
| 2005/0053739 | A1 | 3/2005 | Lee et al. |
| 2008/0029929 | A1 | 2/2008 | Hutchinson et al. |
| 2008/0044605 | A1 | 2/2008 | Lee et al. |
| 2008/0061476 | A1 | 3/2008 | Hutchinson et al. |
| 2010/0109206 | A1 | 5/2010 | Hutchinson et al. |
| 2014/0131920 | A1 | 5/2014 | Nakahara |
| 2016/0361860 | A1 | 12/2016 | Nakahara |
| 2017/0157823 | A1 * | 6/2017 | Takehana ............... B29C 49/06 |
| 2019/0337218 | A1 | 11/2019 | Kawamura et al. |
| 2022/0143897 | A1 | 5/2022 | Kawamura et al. |

FOREIGN PATENT DOCUMENTS

| | | | | |
|---|---|---|---|---|
| CN | 1152898 | A | | 6/1997 |
| CN | 1817609 | A | | 8/2006 |
| DE | 694 15 901 | T2 | | 8/1999 |
| EP | 0 837 763 | A1 | | 4/1988 |
| GB | 1517100 | A | | 7/1978 |
| IE | 43554 | B1 | | 3/1981 |
| IL | 50592 | A | | 11/1979 |
| JP | 07-258394 | A | | 10/1995 |
| JP | 10-337770 | A | | 12/1998 |
| JP | 11-077744 | A | | 3/1999 |
| JP | 11-090975 | A | | 4/1999 |
| JP | 2002103429 | A | * | 4/2002 |
| JP | 2002104362 | A | * | 4/2002 |
| JP | 3325085 | B2 | | 7/2002 |
| JP | 2002-347735 | A | | 12/2002 |
| JP | 2004-148616 | A | | 5/2004 |
| JP | 2004-160670 | A | | 6/2004 |
| JP | 2011-256328 | A | | 12/2011 |
| WO | 93/015887 | A1 | | 8/1993 |
| WO | 97/02939 | A1 | | 1/1997 |
| WO | 2013-012067 | A1 | | 1/2013 |
| WO | 2016/006686 | A1 | | 1/2016 |
| WO | WO-2019078358 | A1 * | 4/2019 | ............ B29C 49/06 |

OTHER PUBLICATIONS

Office Action issued in Chinese family member application No. 202080049485.7 on Apr. 22, 2023 and English translation thereof.
Notification of Reasons for Revocation issued in Japanese Patent Application No. 2021-505789 dated Mar. 17, 2022, along with English translation thereof.
Office Action issued in Inda Patent Application No. 202127057556 dated Apr. 28, 2022, along with English translation thereof.
International Search Report and Written Opinion of the International Searching Authority issued in International Patent Application No. PCT/JP2020/023283, dated Jul. 21, 2020, along with an English translation thereof.
Extended European Search Report issued Oct. 25, 2023 in corresponding European family member application No. 20823235.5.

* cited by examiner

PREFORM, RESIN-MADE CONTAINER, AND MANUFACTURING METHOD THEREFOR

TECHNICAL FIELD

The present invention relates to a preform, a resin-made container, and a manufacturing method for manufacturing the preform and the resin-made container.

BACKGROUND ART

Patent Literature 1 discloses a plastic bottle having a two-layer structure in which an inner layer is made of virgin plastic and an outer layer is made of recycled plastic. Patent Literature 2 discloses a manufacturing method for a laminated resin molded product including: an outer layer molding process of molding a tubular outer layer material using a recycled resin; and an inner layer molding process of laminating and molding, on an inner surface side of the outer layer material, a tubular inner layer material using a virgin resin that is thinner than the outer layer material.

CITATION LIST

Patent Literature

Patent Literature 1: JP-2002-103429-A
Patent Literature 2: JP-2002-104362-A

SUMMARY OF INVENTION

Technical Problem

In recent years, marine pollution caused by plastic waste is seen as a problem seriously, and measures of 3R (reduce, reuse, recycle) of plastics have been activated internationally. For a food/beverage/medicine bottle (food container), there has been developed a method of blow molding a preform that is injection-molded in an inner and outer two-layer structure, in which a virgin material is used for a portion (inner layer) to come into contact with content, and a recycled material is used for a non-contact portion (outer layer). However, with a two-layer molding method in the related art, the haze (turbidity) of the bottle tends to be large. It is difficult to manufacture a bottle having sufficient transparency, and commercialization (practical use) has not progressed.

An object of the present invention is to provide a preform from which a resin-made container having a two-layer structure and having high transparency even when a use ratio of a recycled material is large can be formed, a resin-made container having a two-layer structure and having high transparency even when a use ratio of a recycled material is large, and manufacturing methods for manufacturing the preform and the resin-made container.

Solution to Problem

An aspect of the present invention that can solve the above problem is a preform including:
an opening portion;
a body portion; and
a bottom portion, the preform having a two-layer structure in which the body portion and the bottom portion include an inner layer made of a virgin material and an outer layer made of a recycled material,
in which a weight ratio of the recycled material to a total weight of the preform is 50% by weight or more,
in which a ratio of a thickness of the outer layer to a thickness of the inner layer in the body portion is 1.5 or more, and
in which a haze of a body portion of a container molded from the preform is 1.8% or less.

Another aspect of the present invention that can solve the above problem is a manufacturing method for manufacturing a preform, the preform including an opening portion, a body portion, and a bottom portion, and the preform having a two-layer structure in which the body portion and the bottom portion include an inner layer made of a virgin material and an outer layer made of a recycled material, the manufacturing method including:
a first injection molding process of injecting the virgin material or the recycled material into a first mold to injection mold an inner layer material or an outer layer material; and
a second injection molding process of accommodating the inner layer material or the outer layer material molded in the first injection molding process in a second mold, and injecting the recycled material to an outer side of the inner layer material to injection mold an outer layer material or injecting the virgin material to an inner side of the outer layer material to injection mold an inner layer material,
in which the inner layer material and the outer layer material are molded such that a weight ratio of the recycled material to a total weight of the preform is 50% by weight or more and a ratio of a thickness of the outer layer to a thickness of the inner layer in the body portion is 1.5 or more.

Another aspect of the present invention that can solve the above problem is a resin-made container including:
an opening portion;
a body portion; and
a bottom portion, the resin-made container having a two-layer structure in which the body portion and the bottom portion include an inner layer made of a virgin material and an outer layer made of a recycled material,
in which a weight ratio of the recycled material to a total weight of the resin-made container is 50% by weight or more,
in which a ratio of a thickness of the outer layer to a thickness of the inner layer in the body portion is 1.5 or more, and
in which a haze of the body portion is 1.8% or less.

Another aspect of the present invention that can solve the above problem is a manufacturing method for manufacturing a resin-made container, the manufacturing method including:
an injection molding process of injection molding a preform, the preform including an opening portion, a body portion, and a bottom portion, and the preform having a two-layer structure in which the body portion and the bottom portion include an inner layer made of a virgin material and an outer layer made of a recycled material;
a temperature adjustment process of adjusting a temperature of the preform; and
a blow molding process of blow molding the preform to mold a resin-made container,
in which the injection molding process includes a first injection molding process of injecting the virgin material or the recycled material into a first mold to injection mold an inner layer material or an outer layer material, and a second injection molding process of accommodating the inner layer material or the outer layer material molded in the first injection molding process in a second mold, and injecting the recycled material to an outer side of the inner layer material to injection mold an outer layer material, or injecting the virgin material to an inner side of the outer layer material to injection mold an inner layer material, and in which in the injection molding process, the inner layer material and the outer layer material are molded such that a weight ratio of the recycled material to a total weight of the preform is 50% by weight or more and a ratio of a thickness of the outer layer to a thickness of the inner layer in the body portion is 1.5 or more.

Advantageous Effects of Invention

According to the present invention, it is possible to provide a preform from which a resin-made container having a two-layer structure and having high transparency even when a use ratio of a recycled material is large can be formed, a resin-made container having a two-layer structure and having high transparency even when a use ratio of a recycled material is large, and manufacturing methods for manufacturing the preform and the resin-made container.

DESCRIPTION OF EMBODIMENTS

Figure 1:
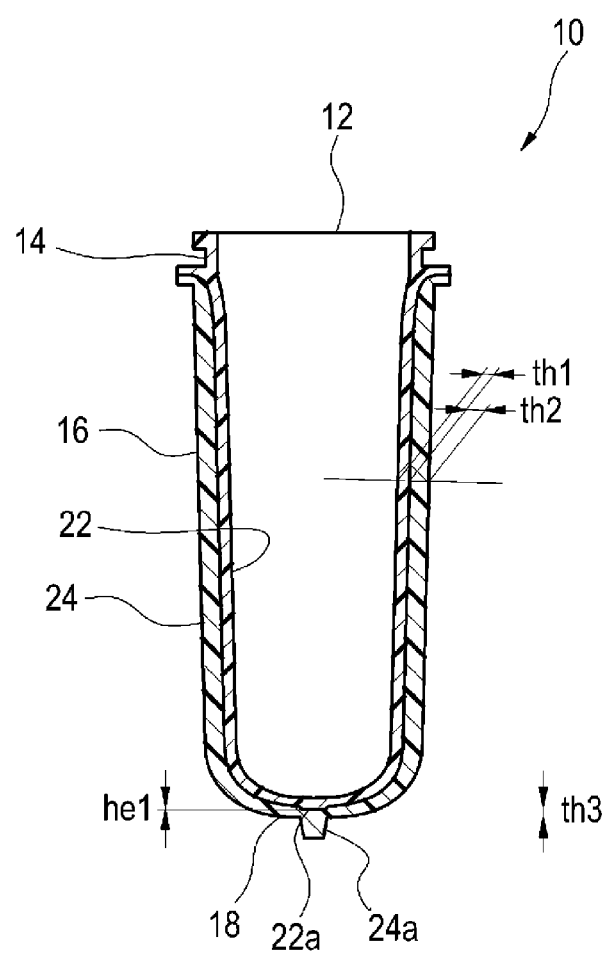
FIG. 1 is a cross-sectional view illustrating a preform according to an embodiment.

Hereinafter, an embodiment of the present invention will be described with reference to the drawings. Note that, for convenience of description, the dimensions of the respective members illustrated in the drawings may be different from the actual dimensions of the respective members.

First, a preform 10 according to an embodiment will be described with reference to FIG. 1. FIG. 1 is a cross-sectional view of the preform 10. The preform 10 is a tubular resin-molded product including an opening portion 12, a neck portion 14 that is continuous with the opening portion 12, a body portion 16 that is continuous with the neck portion 14, and a bottom portion 18 that is continuous with the body portion 16. The body portion 16 and the bottom portion 18 have a two-layer structure including an inner layer 22 and an outer layer 24. The inner layer 22 is made of a virgin material that is an unused resin material. The outer layer 24 is made of a recycled material prepared by recycling a used resin material. As a base material of the virgin material and the recycled material, a thermoplastic resin (crystalline plastic) having transparency in an amorphous state is used, such as a polyethylene terephthalate (PET) resin. The preform 10 is used to mold a resin-made container 30 to be described later.

A weight ratio of the recycled material to a total weight of the preform 10 is 50% by weight or more. The weight ratio is preferably 60% by weight or more from the viewpoint of a recycling rate of a resin material, and is preferably 70% by weight or less from the viewpoint of transparency of a container to be molded. A ratio of a thickness th2 of the outer layer 24 to a thickness th1 of the inner layer 22 in the body portion 16 is 1.5 or more. The ratio is preferably 3.0 or less from the viewpoint of transparency of the container to be molded.

Gate marks 22a and 24a formed by injection molding exist in the inner layer 22 and the outer layer 24 in the bottom portion 18 of the preform 10, respectively. A height he1 of the gate mark 22a of the inner layer 22 is smaller than a thickness th3 of the outer layer 24 in the bottom portion 18.

Figure 2:
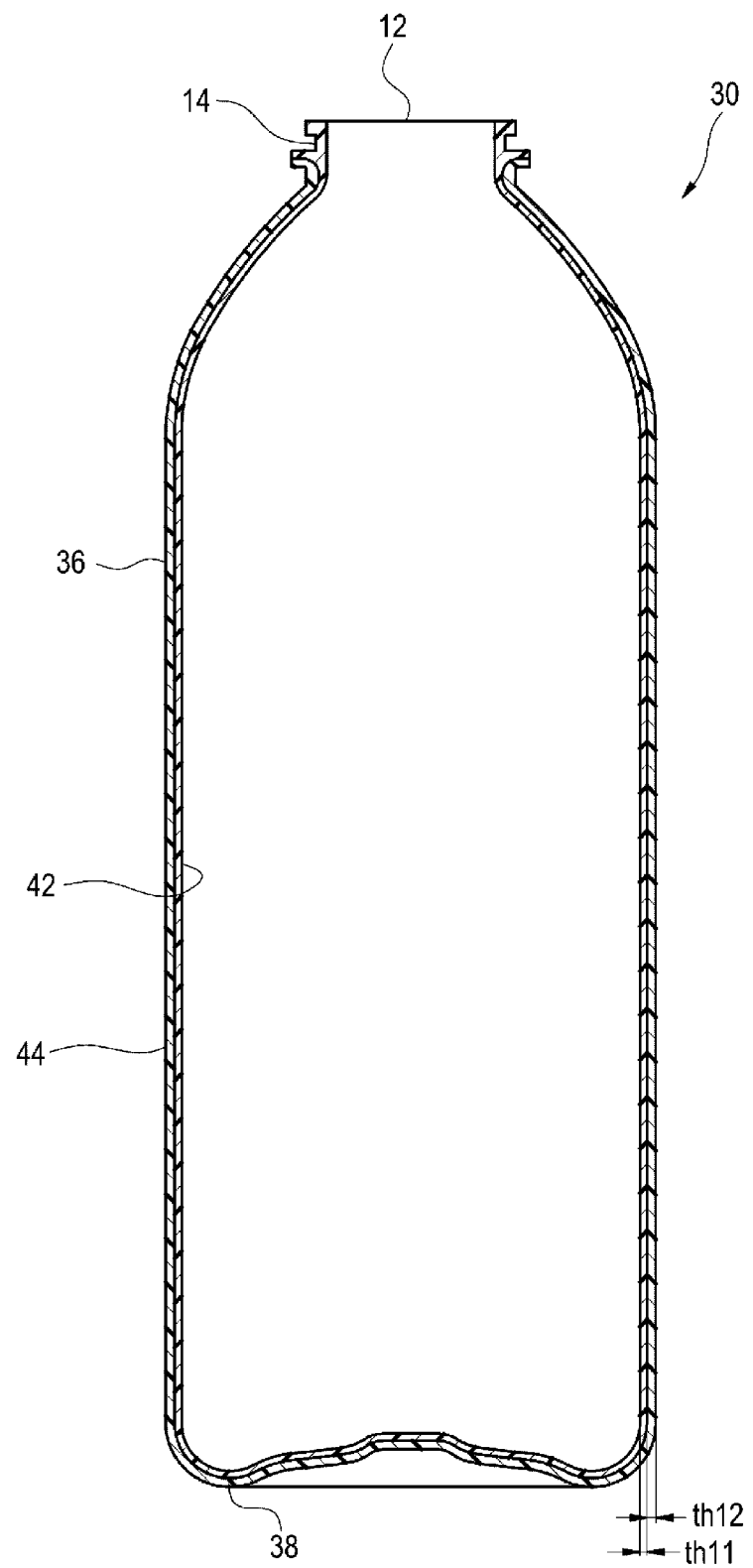
FIG. 2 is a cross-sectional view illustrating a resin-made container according to the embodiment.

Next, the container 30 according to the embodiment will be described with reference to FIG. 2. FIG. 2 is a cross-sectional view of the container 30. The container 30 is a bottle-like resin-made container obtained by blow molding the preform 10. The container 30 includes the neck portion 14 that is continuous with the opening portion 12, a body portion 36 that is continuous with the neck portion 14, and a bottom portion 38 that is continuous with the body portion 36. Similarly to the preform 10, the body portion 36 and the bottom portion 38 have a two-layer structure including an inner layer 42 made of a virgin material and an outer layer 44 made of a recycled material.

A weight ratio of the recycled material to a total weight of the container 30 and a ratio of a thickness th12 of the outer layer 44 to a thickness th11 of the inner layer 42 in the body portion 36 are the same as the weight ratio of the recycled material to the total weight of the preform 10 and the ratio of the thickness th2 of the outer layer 24 to the thickness th1 of the inner layer 22 in the body portion 16, respectively, and thus a description thereof will be omitted.

A haze of the body portion 36 of the container 30 is 1.8% or less, more preferably 1.4% or less, still more preferably 1.0% or less. Although not particularly limited, a lower limit of the haze may be 0.1%. The haze mentioned here represents an average value of values obtained by selecting and measuring 10 arbitrary portions of the body portion 36. The haze is measured using a haze meter (haze meter) in accordance with "Plastics: determination of haze for transparent materials (JIS-K7136: 2000)". The container 30 is a resin-made container of a two-layer structure having high transparency even in a case of a large use ratio of the recycled material, and can achieve a high recycling rate of a plastic material while being highly practical.

Figure 3:
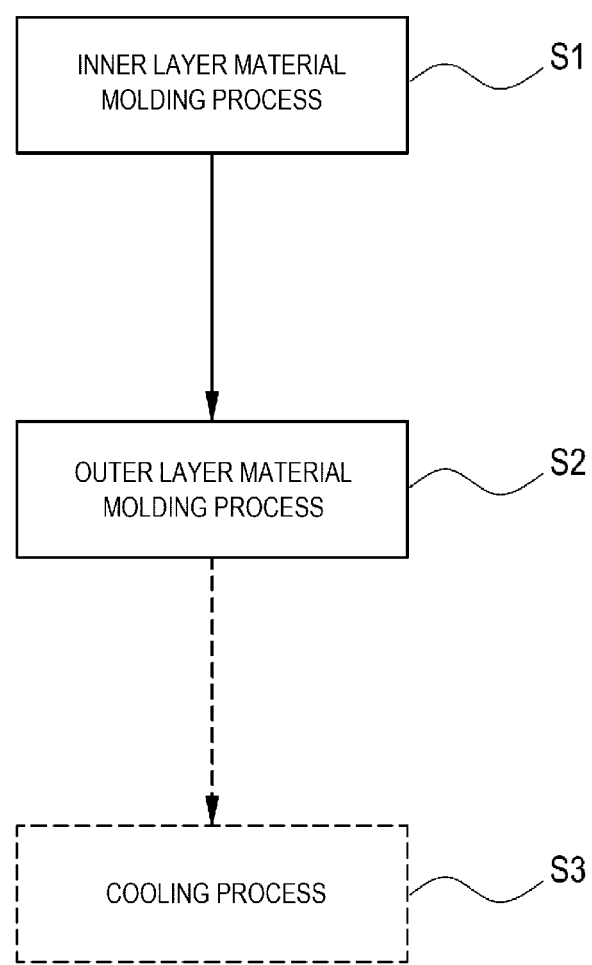
FIG. 3 is a flowchart illustrating a manufacturing process of the preform according to the embodiment.
Figure 4:
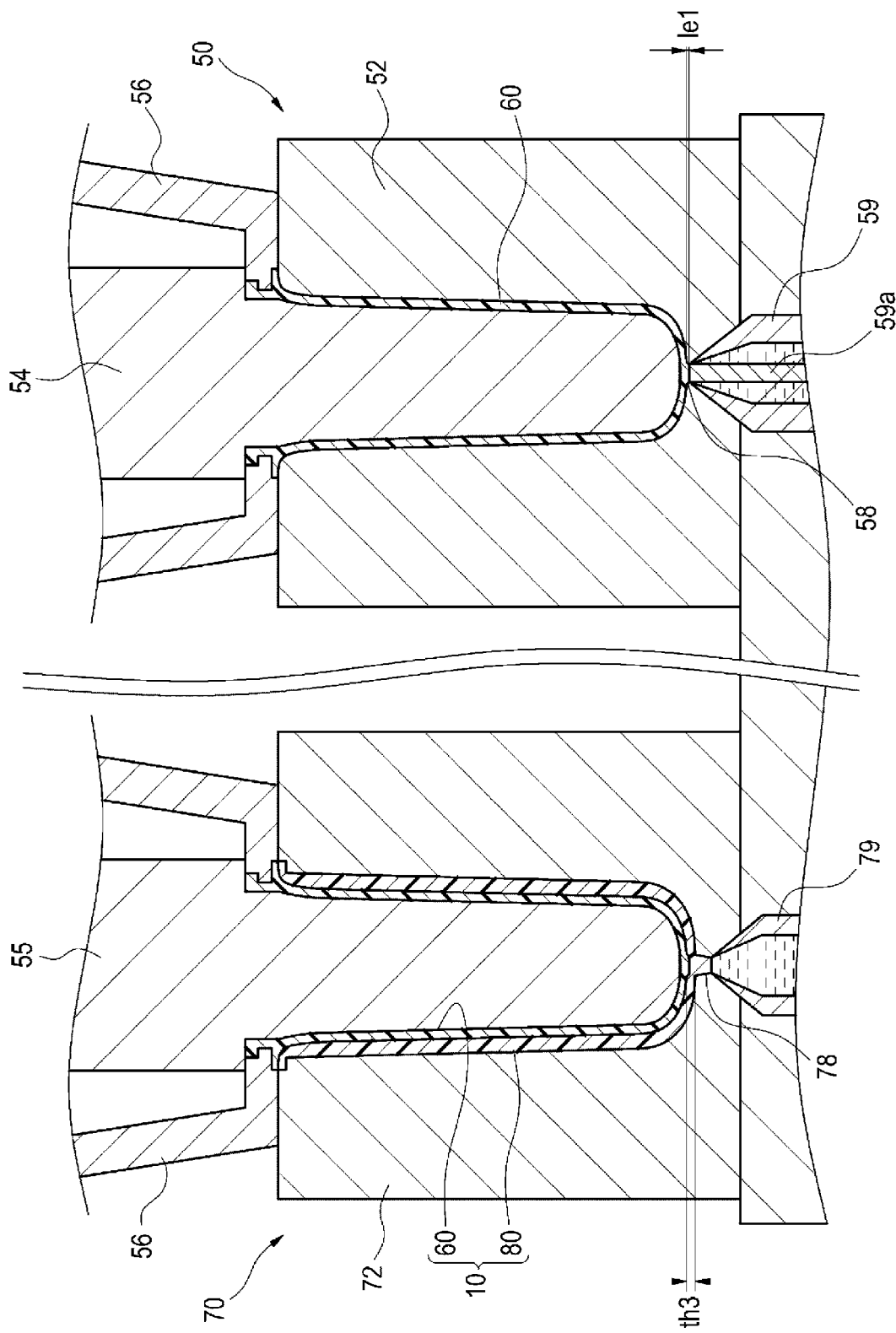
FIG. 4 is a cross-sectional view illustrating a mode of injection molding of the preform according to the embodiment.
Figure 5:
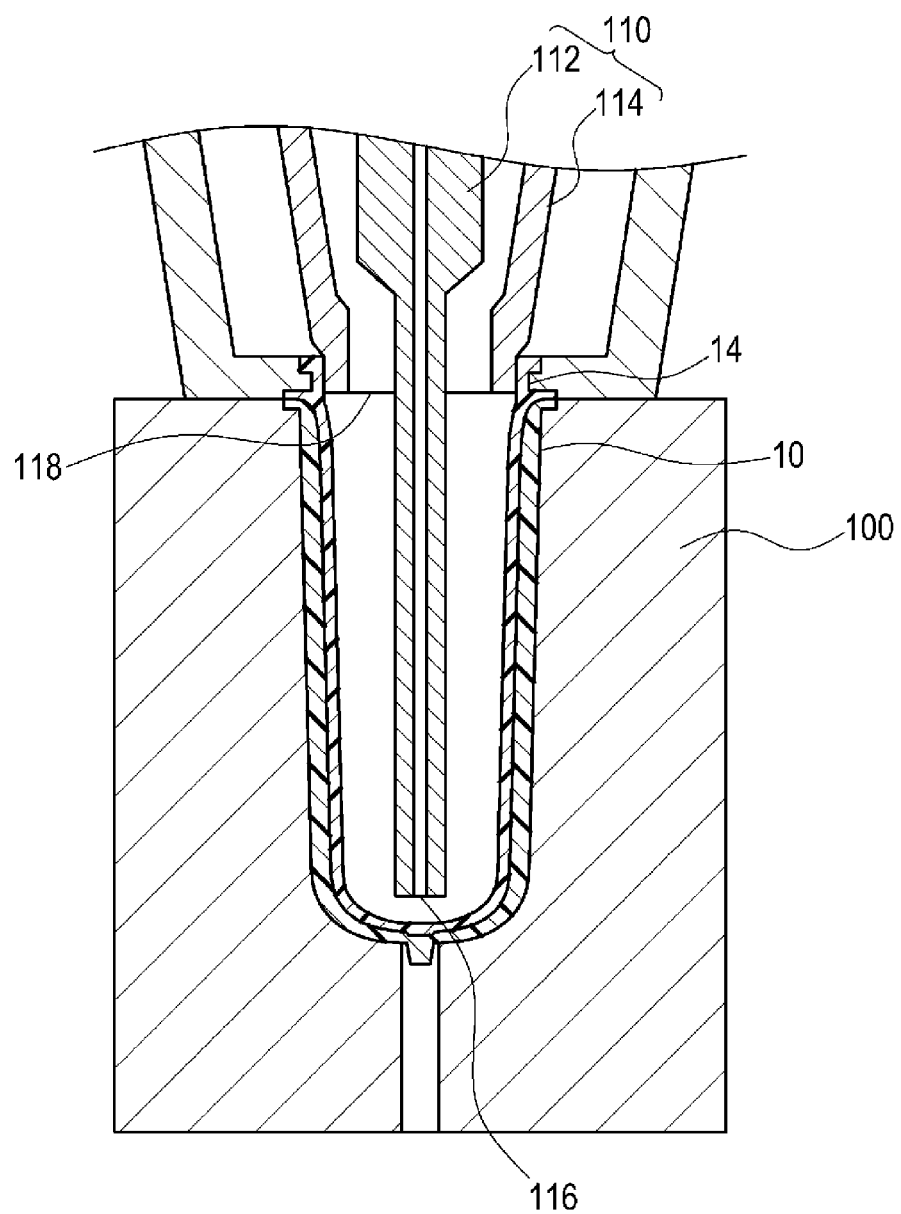
FIG. 5 is a cross-sectional view illustrating a mode of cooling the preform according to the embodiment.
Figure 6:
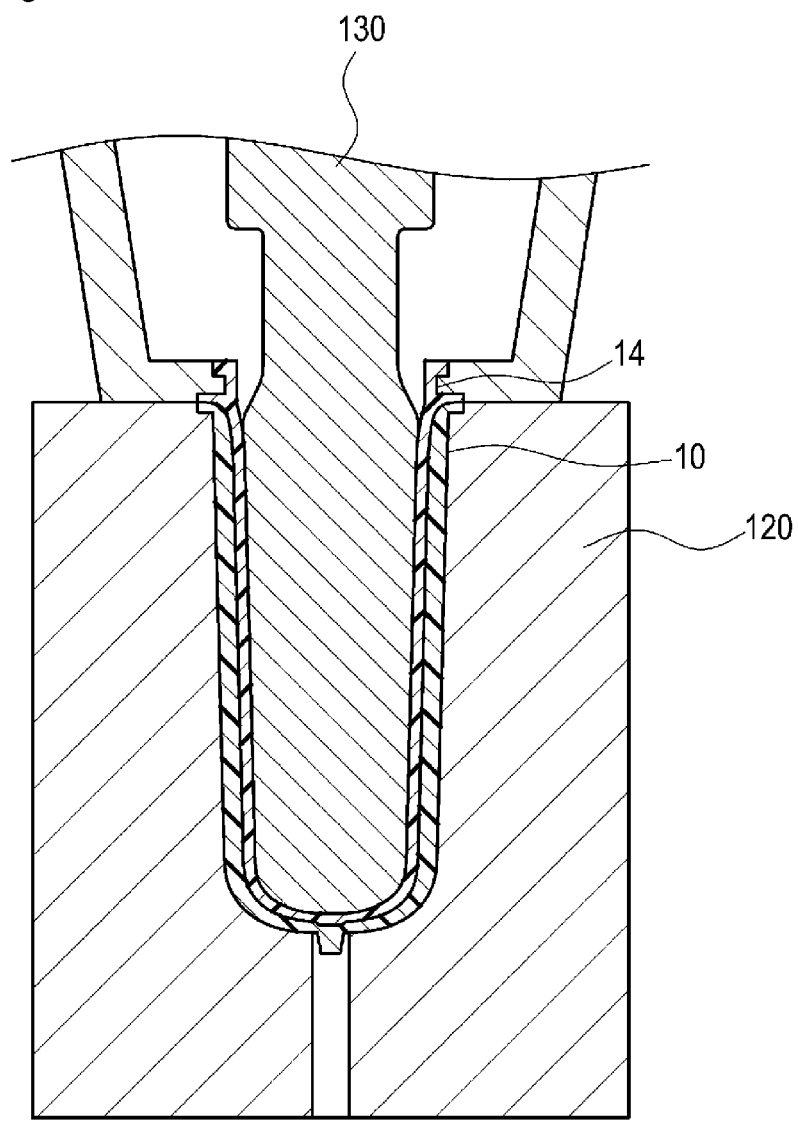
FIG. 6 is a cross-sectional view illustrating another mode of cooling the preform according to the embodiment.

Next, a manufacturing method for the preform 10 will be described with reference to FIGS. 3 to 6. FIG. 3 is a flowchart illustrating a manufacturing process of the preform 10. FIG. 4 is a diagram illustrating a mode of injection molding of the preform 10. FIGS. 5 and 6 are diagrams illustrating modes of cooling after injection molding of the preform 10.

As shown in FIG. 3, the manufacturing method for manufacturing the preform 10 according to the present embodiment includes an inner layer material molding process S1 and an outer layer material molding process S2, which are two steps of injection molding process. Here, each process will be described with reference to FIG. 4. In the inner layer material molding process S1, a virgin material is injected into a cavity defined by a first mold 50, which includes a first cavity mold 52, a first injection core mold 54, and a neck mold 56m, via a first gate 58. The first mold 50 includes a first hot runner mold 59. The first hot runner mold 59 has a valve pin 59a that is movable toward the first gate 58 in a flow path through which a resin material in a molten state (for example, a PET resin in a molten state at about 255° C.) flows. That is, the first gate 58 of the first mold 50 is configured as a valve gate. When filling of the virgin material into the cavity is completed, mold clamping of the first mold 50 is maintained for a predetermined period of time, and thereafter the first mold 50 is opened, so that an inner layer material 60 is molded. A circuit (medium flow hole or medium flow groove) through which a cooling medium (fluid) for cooling the inner layer material 60 flows is provided in the first cavity mold 52 and the first injection core mold 54, and the cooling medium is appropriately set in a range of, for example, about 5° C. to about 20° C.

The molded inner layer material 60 is lifted together with the first injection core mold 54 and the neck mold 56, and is separated from the first cavity mold 52. Further, the first injection core mold 54 is further lifted and is separated from the inner layer material 60. Then, the inner layer material 60 is rotated together with the neck mold 56 by a rotation part (not shown) in a state of being held by the neck mold 56, and is disposed above a second cavity mold 72. In the outer layer material molding process S2, the neck mold 56 that holds the inner layer material 60 is clamped to a second injection core mold 55 and the second cavity mold 72, so that the inner layer material 60 is accommodated in a second mold 70 that includes the second cavity mold 72, the second injection core mold 55, and the neck mold 56. Then, a recycled material in a molten state is injected to a portion on an outer side of the inner layer material 60 in a cavity defined by the second mold 70 via a second gate 78. The second mold 70 includes a second hot runner mold 79. The second hot runner mold 79 may have a valve pin that is movable toward the second gate 78 in a flow path through which a resin material flows. That is, the second gate 78 of the second mold 70 may be configured as a valve gate. When filling of the recycled material into the cavity is completed, mold clamping of the second mold 70 is maintained for a predetermined period of time, and thereafter the second mold 70 is opened, so that the preform 10 including an outer layer material 80 and the inner layer material 60 is molded. In the present embodiment, the inner layer material molding process S1 of the next preform 10 is performed during the outer layer material molding process S2 of the previous preform 10. In addition, in the second cavity mold 72 and the second injection core mold 55, a circuit through which a cooling medium for cooling the outer layer material 80 and the inner layer material 60 flows is provided, and the cooling medium is appropriately set within a range of, for example, about 5° C. to about 20° C.

Note that, the temperature of the cooling medium, that is, a cooling intensity may be different in the first mold 50 and the second mold 70 (for example, the temperature of the cooling medium of the second mold 70 is set to be lower than that of the first mold 50). Further, even in the second mold 70, the cooling intensity may differ in the second cavity mold 72 and in the second injection core mold 55 (for example, the temperature of the cooling medium of the second cavity mold 72 is set to be lower than that of the second injection core mold 55).

In the inner layer material molding process S1 and the outer layer material molding process S2, the inner layer material 60 and the outer layer material 80 are molded by using the first mold 50 and the second mold 70 designed so that the weight ratio of the recycled material (the outer layer material 80) to the total weight of the preform 10 is 50% by weight or more and the ratio of the thickness of the outer layer 24 (the outer layer material 80) to the thickness of the inner layer 22 (the inner layer material 60) in the body portion 16 of the preform is 1.5 or more. Here, a length le1 of the first gate 58 in the first mold 50 is smaller than the thickness th3 of the outer layer 24 (the outer layer material 80) in the bottom portion 18 of the preform 10.

When the manufacturing method for manufacturing the preform 10 according to the present embodiment includes a cooling process S3 of cooling the preform after the outer layer material molding process S2, cooling time of the injection molding process can be shortened, which is preferable from the viewpoint of production efficiency (FIG. 3). The cooling process S3 mentioned here does not include the process in which the preform 10 is cooled with the second mold 70 when the mold clamping of the second mold 70 is maintained. Here, a mode of the cooling process S3 will be described with reference to FIGS. 5 and 6.

FIG. 5 is a diagram illustrating a state of a mode of the cooling process S3. In the cooling process S3 illustrated in FIG. 5, the preform 10 released from the second mold 70 is accommodated in a third cavity mold 100, and an air introduction member 110 is brought into contact with the preform 10 airtightly. The air introduction member 110 includes a rod member 112 that is hollow and provided with an air flow hole inside, and a fitting core (blow core member) 114. The rod member 112 is accommodated inside the fitting core 114 so as to be movable up and down. An inner-side flow port 116 through which air can be jetted or sucked is provided in a tip of the rod member 112. A temperature of the air is appropriately set within a range of, for example, about 0° C. to about 20° C. (normal temperatures) according to a thickness of the preform 10 or the container 30. The fitting core 114 is configured to be fitted into (brought into close contact with) the neck portion 14 when the air introduction member 110 is inserted into the preform 10 (when the air introduction member 110 is brought into contact with the perform 10 airtightly). Accordingly, it is possible to prevent the air inside the preform 10 from leaking from the neck portion 14 to the outside of the fitting core 114. A gap between the rod member 112 and the fitting core 114 is an air flow path for supplying and discharging air to and from the preform 10. A gap formed by a tip of the fitting core 114 and the rod member 112 constitutes an outer-side flow port 118 through which air can be jetted or sucked. The inner-side flow port 116 and the outer-side flow port 118 may be an air-blowing port and a discharge port respectively. For example, air is fed into the preform 10 from the air-blowing port of the air introduction member 110, and air is discharged from the discharge port of the air introduction member 110 to the outside of the preform 10, thereby cooling the preform 10. In addition, a circuit for a cooling medium for cooling the outer layer material 80 is also provided in the third cavity mold 100, and the fluid medium is appropriately set in a range of, for example, about 5° C. to about 80° C., more preferably 10° C. to 70° C., and still more preferably 20° C. to 65° C.

FIG. 6 is a diagram illustrating a state of another mode of the cooling process S3. In the cooling process S3 illustrated in FIG. 6, the preform 10 released from the second mold 70 is accommodated in a fourth cavity mold 120, and the preform 10 is sandwiched between the fourth cavity mold 120 and a core mold 130 configured to be movable up and down, thereby cooling the preform 10. The fourth cavity mold 120 and the core mold 130 are also provided with a circuit through which a cooling medium set in a range of, for example, about 5° C. to about 80° C., more preferably 10° C. to 70° C., and still more preferably 20° C. to 65° C. flows.

Figure 7:
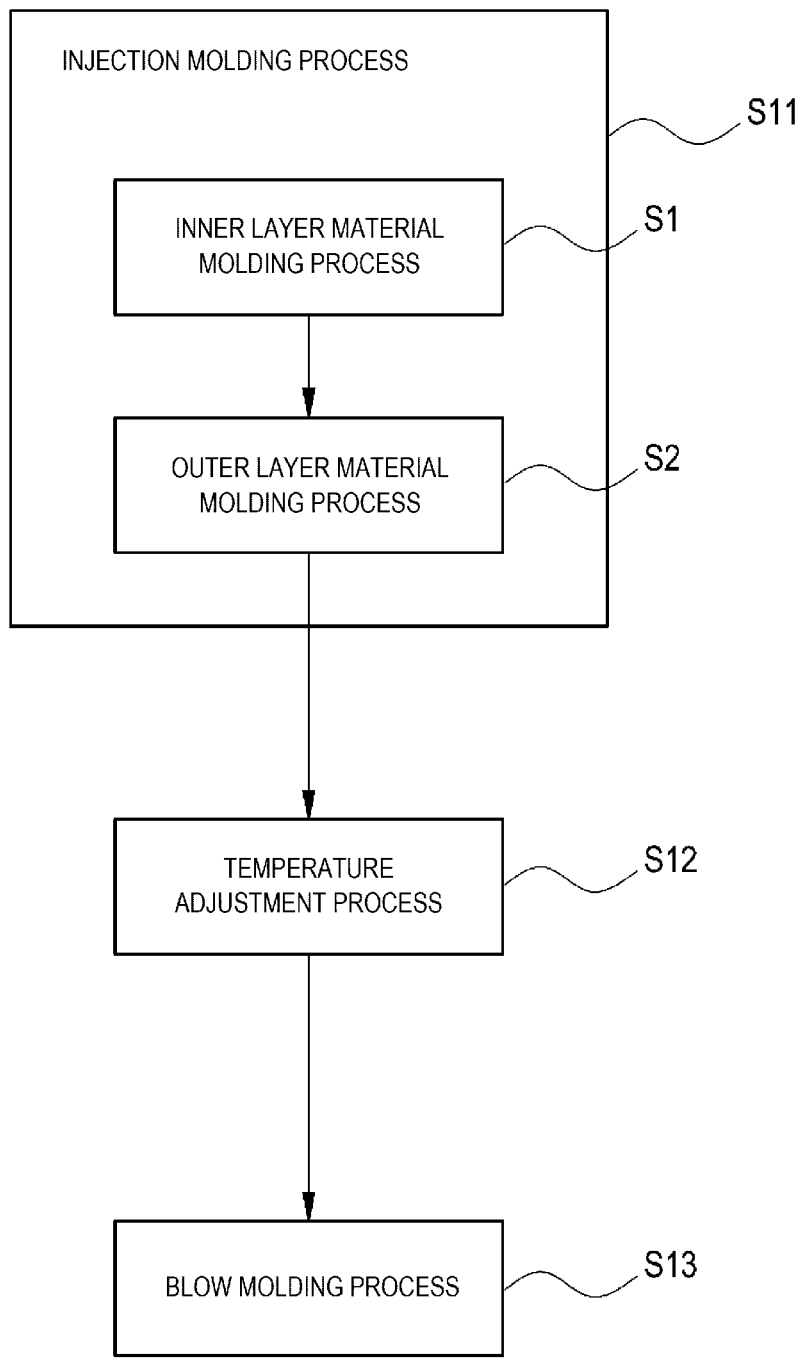
FIG. 7 is a flowchart illustrating a manufacturing process of the resin-made container according to the embodiment.

Next, a manufacturing method for manufacturing the container 30 will be described with reference to FIGS. 4 to 7. FIG. 7 is a diagram illustrating a manufacturing process of the container 30. As illustrated in FIG. 7, the manufacturing method for manufacturing the container 30 according to the present embodiment includes an injection molding process S11 of injection molding the preform 10, a temperature adjustment process S12 of adjusting a temperature of the preform 10, and a blow molding process S13 of blow molding the preform 10 to mold the container 30.

First, the injection molding process S11 will be described. The injection molding process S11 includes the inner layer material molding process S1 and the outer layer material molding process S2 described in the manufacturing method for manufacturing the preform 10. In the injection molding process S11, as described in the inner layer material molding process S1 and the outer layer material molding process S2 of the preform 10, the inner layer material 60 and the outer layer material 80 are molded such that the weight ratio of the recycled material (the outer layer material 80) to the total weight of the preform 10 is 50% by weight or more and the ratio of the thickness of the outer layer 24 (the outer layer material 80) to the thickness of the inner layer 22 (the inner layer material 60) in the body portion 16 of the preform is 1.5 or more. The first mold 50 used in the inner layer material molding process S1, the second mold 70 used in the outer layer material molding process S2, and other modes adopted in the injection molding process S11 are similar to those described in the manufacturing method for the preform 10 (FIG. 4), and thus a description thereof will be omitted.

Next, the temperature adjustment process S12 will be described. The temperature adjustment process S12 is a process of adjusting a temperature of the injection-molded preform 10 to a temperature range suitable for blow molding. In the temperature adjustment process S12, the temperature of the preform 10 is adjusted by using a temperature adjustment pod, a temperature adjustment core, an infrared heater, or the like. In addition, in the temperature adjustment process S12, the modes (FIGS. 5 and 6) described in the cooling process S3 of the manufacturing method for the preform 10 may be adopted, and the temperature may be adjusted while cooling the preform. When the temperature adjustment process S12 adopts the modes described in the cooling process S3 of the manufacturing method for the preform 10, the production efficiency of the container 30 is improved, which is preferable. In particular, when performing the manufacturing of the preform 10 and the container 30 continuously in a hot parison type manufacturing device of a resin-made container shown in FIG. 8 that will be described later, the production efficiency of the container 30 is improved, which is preferable. In addition, when performing the injection molding and blow molding of a two-layer preform continuously using a hot parison type blow molding method, a boundary portion between the inner layer 22 and the outer layer 24 is insufficiently cooled (gradually cooled), and the haze is likely to increase. However, when the modes (FIGS. 5 and 6) described in the cooling process S3 are adopted in the temperature adjustment process S12, the cooling efficiency of the boundary portion can be improved while the amount of heat required in the blow molding is maintained, and the haze of the container 30 can be reduced. When the cooling process S3 is adopted in the temperature adjustment process S12, the temperatures of the cooling medium flowing through the third cavity mold 100, the fourth cavity mold 120, and the core mold 130 are appropriately set in a wider range of, for example, about 10° C. to about 65° C.

Next, the blow molding process S13 will be described. In the blow molding process S13, the preform 10 is accommodated in a blow cavity mold. Subsequently, while the preform 10 is optionally stretched by a stretching rod, the preform 10 is inflated to a shape of the container 30 by introducing blow air from a blow core mold, and the container 30 is manufactured. Thereafter, the container 30 is released from the mold. The container is manufactured according to the above procedure.

Figure 8:
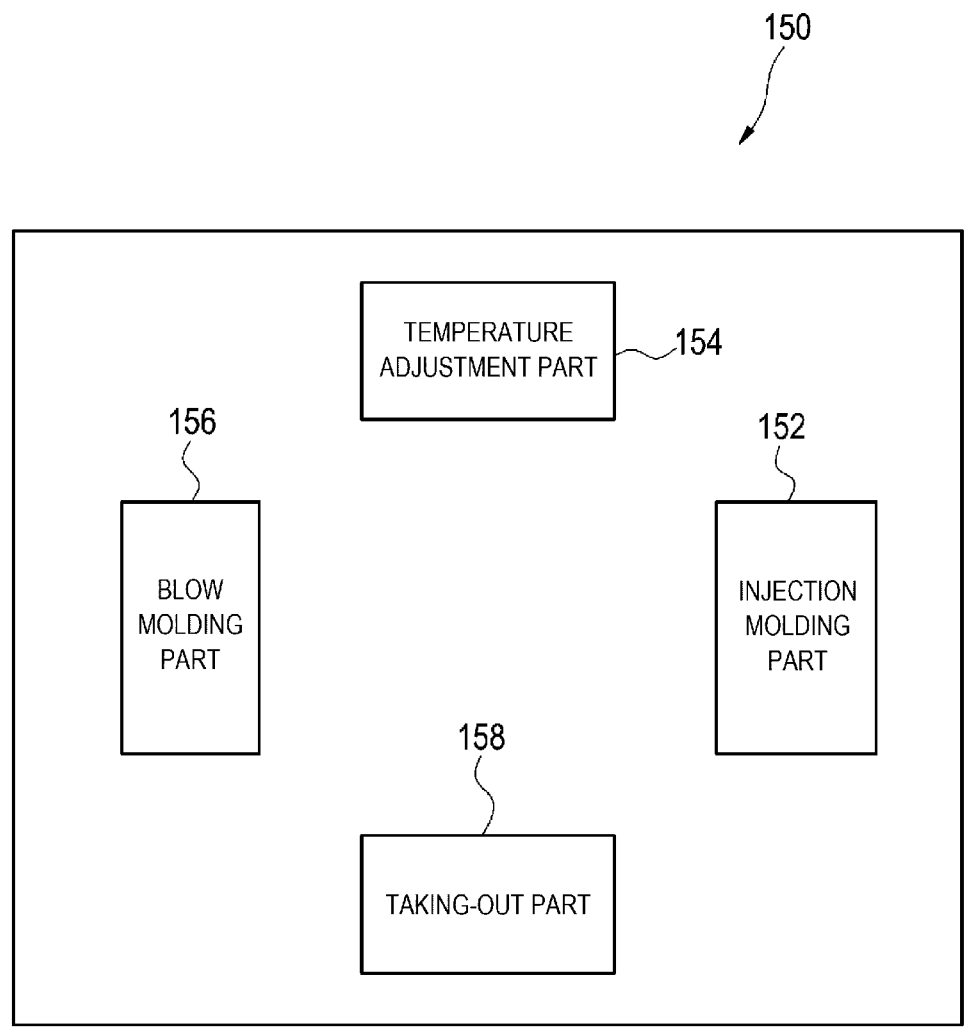
FIG. 8 is a schematic view illustrating a manufacturing device of the resin-made container according to the embodiment.

Here, a manufacturing device 150 of the container 30 according to the present embodiment will be described with reference to FIG. 8. FIG. 8 is a functional block diagram of the manufacturing device 150 of the container 30. The manufacturing device 150 includes an injection molding part 152 for manufacturing the preform 10, a temperature adjustment part 154 for adjusting the temperature of the manufactured preform 10, a blow molding part (an example of a blow device) 156 for blowing the preform 10 to manufacture the container 30, and a taking-out part 158 for taking out the manufactured container 30. The preform 10 and the container 30 are conveyed by a conveying part (not illustrated) in an order of the injection molding part 152, the temperature adjustment part 154, the blow molding part 156, and the taking-out part 158 in the manufacturing device 150. As modes of the injection molding part 152, the temperature adjustment part 154, and the blow molding part 156, configurations of the modes (FIGS. 4 to 6) described in the manufacturing method for the preform 10 and the manufacturing method for the container 30 are adopted. The manufacturing device 150 is a hot parison type manufacturing device of a resin-made container, and continuously performs the manufacturing of the preform 10 and the container 30.

In the meantime, during the international activation of the measures of 3R of plastics, various recycling measures are taken with an ultimate goal of the "Bottle-to-Bottle" recycling even in the field of a PET container. For example, a detergent/toner PET bottle (non-food container) is often manufactured using a blended material of a flake material obtained by pulverizing a used PET bottle or a recycled pellet material and a virgin material. On the other hand, a food/beverage/medicine PET bottle (food container) is manufactured using a virgin material, and a recycled material is seldom used. This is because this type of PET bottle is required to have high safety on sanitation. Therefore, there has been developed a method of blow molding a preform that is injection-molded in an inner and outer two-layer structure, in which a virgin material is used for a portion (inner layer) to come into contact with the content, and a recycled material is used for a non-contact portion (outer layer).

However, with a two-layer molding method in the related art, the haze (turbidity) of the bottle tends to be large. It is difficult to manufacture a bottle having sufficient transparency, and commercialization (practical use) has not progressed. In addition, also in the case of using a blended material, considering the transparency of the bottle, a use ratio (weight ratio) of a recycled pellet material is limited to about 30% by weight at most, and further improvement is required.

According to the preform 10 having the above configuration, it is possible to form the resin-made container 30 having a two-layer structure and having high transparency even when the use ratio of the recycled material is large. Specifically, it is possible to form a resin-made container having transparency equivalent to that of a container formed from a two-layer preform made of a blended material containing 30% by weight of a recycled pellet material.

In addition, in the preform 10, since the height "he1" of the gate mark 22a is smaller than the thickness "th3" of the outer layer 24 in the bottom portion 18, an occurrence that the virgin material melts and mixes with the recycled material at the time of injecting the recycled material can be suppressed. Accordingly, it is possible to provide the preform 10 in which whitening in the bottom portion 18 thereof can be suppressed and from which the resin-made container 30 that has a two-layer structure and has high transparency can be formed.

In addition, the recycled material has a higher crystallization rate and is likely to whiten as compared with the virgin material. In order to suppress whitening of the recycled material, the inner layer material 60 made of the virgin material was molded first, and then the outer layer material 80 made of the recycled material was molded. However, the following was found: a phenomenon occurs that, due to injection of the recycled material, the virgin material is reheated in a temperature range (for example, at about 150° C. in the case of the PET resin) in which the virgin material is likely to crystalize and is cooled gradually, and whitening (crystallization) is likely to occur in a boundary surface between the virgin material and the recycled material. Accordingly, the cooling efficiency of the inner layer 22 by the first mold 50 and the second mold 70 (second injection core mold 55) is increased by lowering a weight ratio of the virgin material to the total weight of the preform 10 and reducing the thickness of the inner layer 22 with respect to the outer layer 24, so that the whitening in the boundary surface between the virgin material and the recycled material can be successfully suppressed. That is, according to the above-described manufacturing method for manufacturing the preform 10, the inner layer material 60 made of the virgin material is molded and thereafter the outer layer material 80 made of the recycled material is molded, and the inner layer material 60 and the outer layer material 80 are molded such that the weight ratio of the recycled material to the total weight of the preform 10 is 50% by weight or more and the ratio of the thickness th2 of the outer layer 24 to the thickness th1 of the inner layer 22 in the body portion 16 is 1.5 or more. Accordingly, it is possible to provide the preform 10 capable of forming the resin-made container 30 that has a two-layer structure and has high transparency even when the use ratio of the recycled material is large.

In addition, in the above-described manufacturing method for manufacturing the preform 10, since the length le1 of the first gate 58 from which the virgin material is injected is smaller than the thickness th3 of the outer layer 24 in the bottom portion 18, the height he1 of the gate mark 22a formed in the inner layer material 60 is reduced, and it is possible to prevent the virgin material from melting and mixing with the recycled material at the time of injecting the recycled material. Accordingly, it is possible to provide the preform 10 in which whitening caused by crystallization or the like in the bottom portion 18 thereof can be suppressed and from which the resin-made container 30 that has a two-layer structure and has high transparency can be formed.

In addition, in the above-described manufacturing method for manufacturing the preform 10, since the cooling process S3 of cooling the preform 10 after the outer layer material molding process S2 is provided, it is possible to shorten the cooling time of the preform 10 at the time of injection molding. Accordingly, molding of the next preform 10 can be started during the cooling of the preform 10, and the production efficiency can be improved.

In addition, since the preform 10 is cooled by sending and discharging air in the cooling process S3 of the above-described manufacturing method for manufacturing the preform 10, it is possible to accelerate the cooling of the preform 10. Accordingly, it is possible to provide the preform 10 from which the resin-made container 30 which has a two-layer structure and is more excellent in transparency can be formed, while improving the production efficiency of the preform 10.

In addition, since the preform 10 is sandwiched between the fourth cavity mold 120 and the core mold 130 in the cooling process S3 of the above-described manufacturing method for manufacturing the preform 10, it is possible to accelerate the cooling of the preform 10. Accordingly, it is possible to provide the preform 10 from which the resin-made container 30 which has a two-layer structure and is more excellent in transparency can be formed, while improving the production efficiency of the preform 10.

In addition, according to the above-described manufacturing method for manufacturing the container 30, the outer layer material 80 of the preform 10 is molded after the inner layer material 60 of the preform 10 is molded, and the inner layer material 60 and the outer layer material 80 of the preform 10 are molded such that the weight ratio of the recycled material to the total weight of the preform 10 is 50% by weight or more and the ratio of the thickness th2 of the outer layer 24 to the thickness th1 of the inner layer 22 in the body portion 16 is 1.5 or more. Accordingly, it is possible to provide the container 30 having a two-layer structure and having high transparency even when a use ratio of the recycled material is large. In addition, regarding the hot parison type two-layer molding method in the related art, since the haze of the container tends to become large and it is difficult to manufacture a bottle having sufficient transparency, commercialization (practical use) has not progressed. According to the above method, in particular, in the hot parison type two-layer molding method, it is possible to provide the container 30 having a two-layer structure and having high transparency even when the use ratio of the recycled material is large.

In addition, since the injection molding process S11 and the temperature adjustment process S12 in the above-described manufacturing method for manufacturing the container 30 adopt the modes described in the manufacturing method for manufacturing the preform 10, it is possible to form a resin-made container having a two-layer structure and being more excellent in transparency, it is possible to shorten cycle time of container molding, and it is possible to improve the production efficiency.

Figure 9:
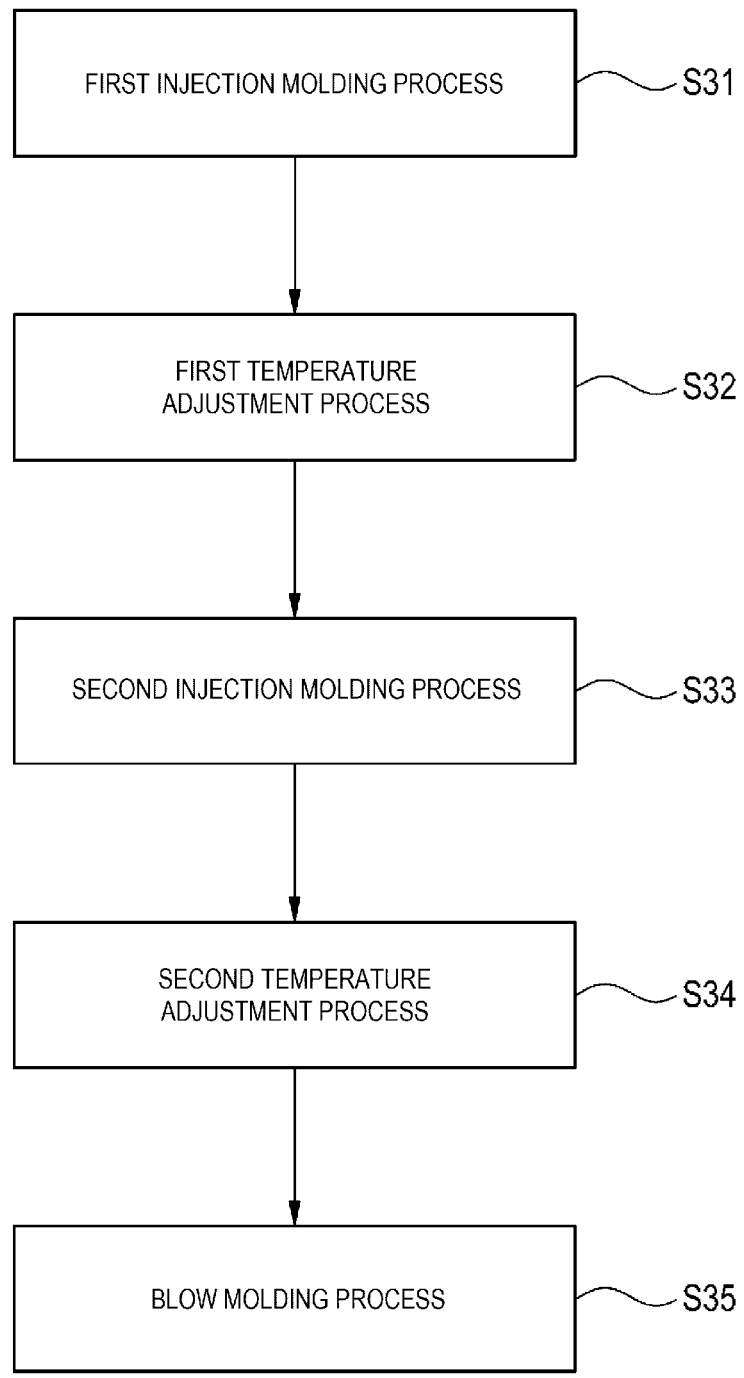
FIG. 9 is a flowchart illustrating a manufacturing process of a resin-made container according to a modification of the embodiment.

Although a mode is described in the above embodiment in which the outer layer material molding process S2 is performed after the inner layer material molding process S1, the present invention is not limited to this mode. FIG. 9 is a flowchart illustrating a manufacturing process of a resin-made container according to a modification of the above embodiment. As shown in FIG. 9, a first injection molding process S31, a first temperature adjustment process S32, a second injection molding process S33, a second temperature adjustment process S34, and a blow molding process S35 may be performed in this order to manufacture a resin-made container. In molding a preform, the first injection molding process S31, the first temperature adjustment process S32, the second injection molding process S33, and the second temperature adjustment process S34 may be performed in this order.

The first injection molding process S31 in this modification is a process of molding any one of an inner layer material and an outer layer material of a preform, and the second injection molding process S33 is a step of molding one of the inner layer material and the outer layer material of the preform that is not molded in the first injection molding process S31 to mold the preform. The first temperature adjustment process S32 is a process of adjusting a temperature of the inner layer material or the outer layer material of the preform molded in the first injection molding process S31. The first temperature adjustment process S32 may be a step of cooling the inner layer material or the outer layer material of the preform. In the first temperature adjustment process S32 between the first injection molding process S31 and the second injection molding process S33, the inner layer material or the outer layer material of the preform that is first molded is subjected to post-cooling (in particular, a surface on which a resin material is to be laminated in the second injection molding process S33 is subjected to post-cooling), so that haze reduction of the two-layer preform (haze reduction by suppressing whitening in a boundary surface between the inner layer material and the outer layer material) and molding cycle shortening can be realized. The second temperature adjustment process S34 is a process of adjusting a temperature of the preform molded in the second injection molding process S33. The second temperature adjustment process S34 may be a process of cooling the preform. The blow molding process S35 is a process of blow molding the preform whose temperature is adjusted in the second temperature adjustment process S34 to obtain the resin-made container.

Figure 10:
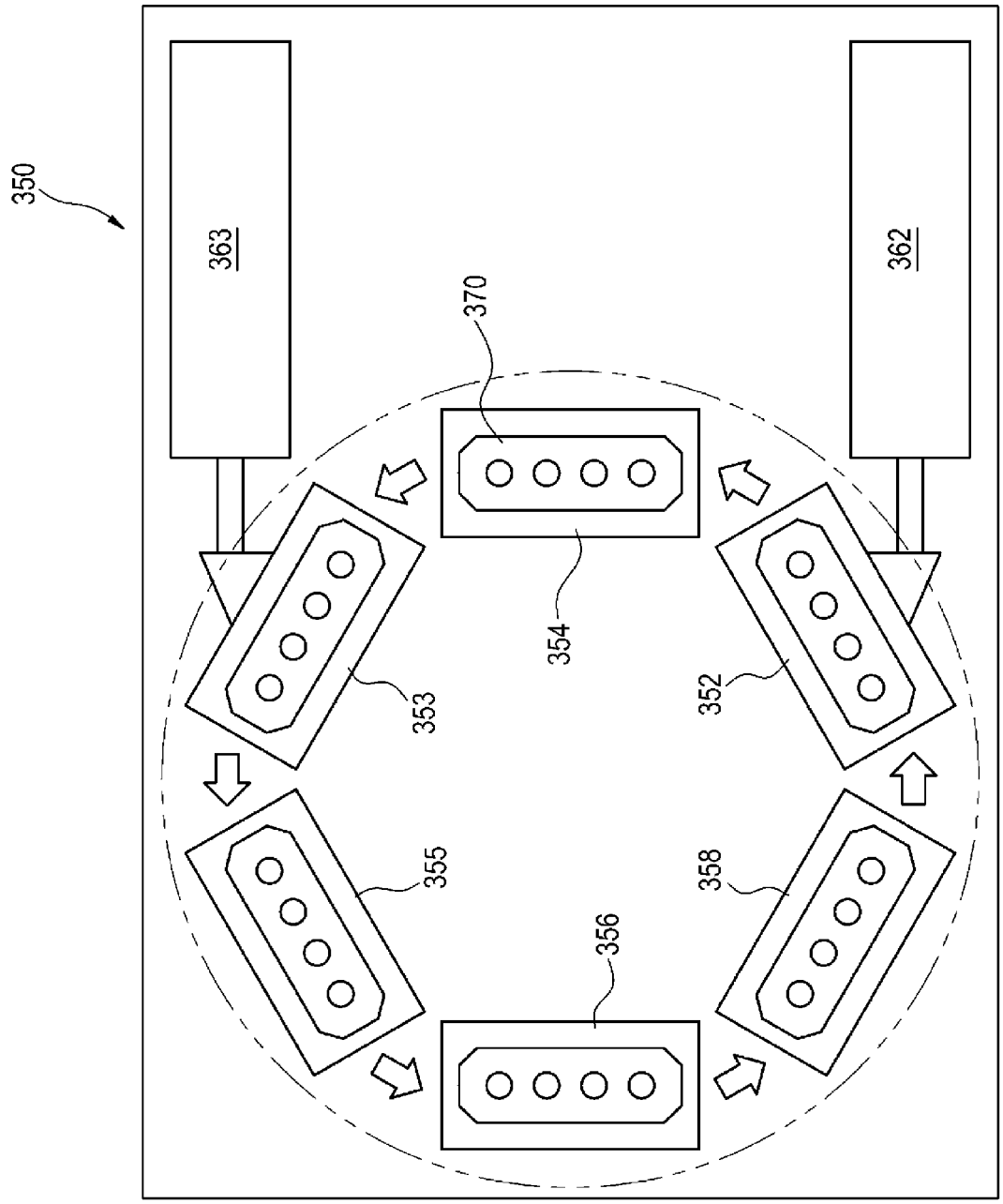
FIG. 10 is a schematic view illustrating a manufacturing device of the resin-made container according to the modification of the embodiment.

FIG. 10 is a schematic diagram illustrating a manufacturing device 350 for a resin-made container according to a modification of the above-described embodiment. As illustrated in FIG. 10, the manufacturing device 350 is a six-station type manufacturing device including: a first injection molding part 352 that includes a first injection device 362; a first temperature adjustment part 354; a second injection molding part 353 that includes a second injection device 363; a second temperature adjustment part 355; a blow molding part 356; and a taking-out part 358. In the manufacturing device 350, the preform and the resin-made container are conveyed in a direction of arrows shown in the drawing by a conveying device 370 including a rotary disk or the like, and are molded in accordance with the manufacturing process described above. As specific modes of the stations, the modes of the above-described embodiment can be adopted as appropriate.

Figure 11:
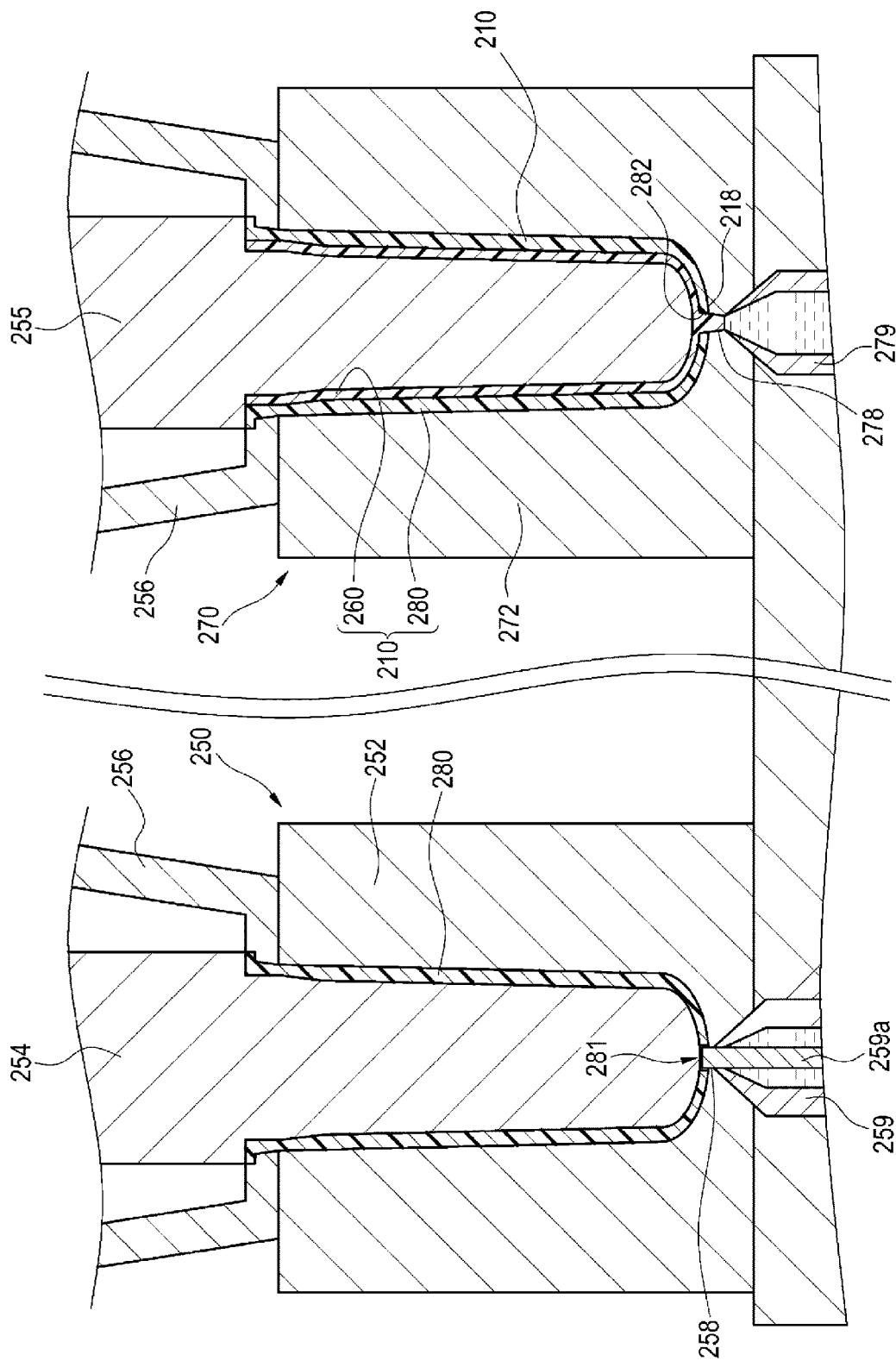
FIG. 11 is a cross-sectional view illustrating a mode of injection molding of a preform according to the modification of the embodiment.

Although a mode is described in the above-described embodiment in which the two-step injection molding process of performing the outer layer material molding process S2 after the inner layer material molding process S1 is included, a mode in which an inner layer material is molded after an outer layer material is firstly molded may be adopted. Hereinafter, a modification of the present embodiment will be described with reference to FIG. 11. FIG. 11 is a cross-sectional view illustrating a mode of injection molding of a preform 210 according to the modification of the above-described embodiment.

Hereinafter, the present modification will be described based on a manufacturing device that molds the preform 210 and molds a resin-made container from the preform 210. The manufacturing device according to the present modification is similar to the manufacturing device 150 and the manufacturing device 350 described in the above-described embodiment and modification except that a configuration of the injection molding part is different. The injection molding part of the manufacturing device of the present modification includes a first mold 250 that molds an outer layer material 280 and a second mold 270 that molds an inner layer material 260 on an inner side of the outer layer material 280 (see FIG. 11).

The first mold 250 includes a first cavity mold 252, a first injection core mold 254, and a neck mold 256. The first mold 250 is configured to form the outer layer material 280 by pouring a recycled material into a cavity defined by mold clamping of these molds. The recycled material is supplied from a first hot runner mold 259 and poured into the cavity via a first gate 258.

The first hot runner mold 259 has a valve pin 259a movable toward the first gate 258 in a flow path through which the recycled material flows. The valve pin 259a is configured to move to a position close to the first injection core mold 254 through the first gate 258 after the recycled material is filled in the cavity. Accordingly, a thin film portion 281 having a thickness smaller than that of a peripheral portion is formed in a central portion of a bottom portion of the outer layer material 280.

The second mold 270 includes a second cavity mold 272, a second injection core mold 255, and a neck mold 256. The neck mold 256 is a common neck mold that moves to a position of the second mold 270 in a state of holding the outer layer material 280 molded by the first mold 250. A core diameter of the second injection core mold 255 is smaller than a core diameter of the first injection core mold 254 by a thickness of the layer of the inner layer material 260. In addition, a size (diameter) of a recess in a top view of the second cavity mold 272 is the same as a size (diameter) of a recess in a top view of the first cavity mold 252. The second mold 270 is configured to form the inner layer material 260 on the inner side of the outer layer material 280, which is molded by the first mold 250, by pouring a virgin material into a cavity defined by mold clamping of these molds.

The virgin material is supplied from a second hot runner mold 279 and is poured into the cavity via a second gate 278. The thin film portion 281 formed in the outer layer material 280 is broken by the flow of the virgin material and thus the virgin material is poured into the cavity. When the thin film portion 281 of the outer layer material 280 is broken, an opening portion 282 is formed in a bottom portion 218 of the preform 210 (the bottom portion of the outer layer material 280). The virgin material poured into the cavity is filled into the cavity via the opening portion 282.

In the present modification, a two-step injection molding process is adopted in which the outer layer material molding process of molding the outer layer material 280 by the first mold 250 is performed, and thereafter the inner layer material molding process of molding the inner layer material 260 on the inner side of the outer layer material 280 by the second mold 270 is performed. In the present modification, the preform 210 is molded such that a weight ratio of the recycled material to a total weight of the preform 210 formed by the two-step injection molding process and a ratio of a thickness of the outer layer with respect to a thickness of the inner layer in the body portion are similar to those in the above-described embodiment. In addition, in the present modification, the container is molded such that the haze of the body portion of the container formed from the preform 210 is similar to that in the above-described embodiment.

In the present modification, unlike the method (see FIG. 7) in which the outer layer material molding process S2 is performed after the inner layer material molding process S1, no gate mark is formed in the outer layer material 280 (recycled material) that is first molded in the first injection molding process. Therefore, the possibility that the virgin material and the recycled material are melted and mixed in a bottom region of the preform 210 is further lowered, and whitening (crystallization or the like) of the bottom portion can be more reliably suppressed. An injection amount of the inner layer material 260 (virgin material) injected in the second injection molding process is smaller than an injection amount of the outer layer material 280 (recycled material) injected in the first injection molding process, and a degree of reheating of the first molded outer layer material 280 is also reduced. Therefore, a phenomenon that whitening (crystallization) occurs in a boundary surface between the virgin material and the recycled material is unlikely to occur. As a result, in the present modification, the preform 210 from which a resin-made container having a two-layer structure and having high transparency can be formed can be manufactured and provided more easily.

The present modification is preferably performed by the manufacturing method of FIG. 9 and the manufacturing device 350 of FIG. 10. This is because the thick outer layer material 280 of the preform 210 made of the recycled material can be additionally cooled (subjected to post-cooling) in the first temperature adjustment process S32 (first temperature adjustment part 354) in addition to being cooled in the first injection molding process S31 (first mold 250). Accordingly, it is possible to sufficiently cool the thick outer layer material 280 of the preform 210 to decrease the temperature thereof, and thus it is possible to suppress a temperature rise (reheating) of the outer layer material 280 due to the injection of the virgin material in the second injection molding process S33 (second mold 270). Therefore, whitening of the preform 210 can be further reduced, and a container having a lower value of haze can be manufactured.

EXAMPLE

Hereinafter, an example of the present embodiment will be described. Note that the technical scope of the present invention is not limited to the present example. The technical scope of the present invention is defined in the claims or in a scope equivalent thereto.

By using the manufacturing device 150 described in the present embodiment and changing the resin material used in the injection molding of the preform, manufacturing tests of resin-made containers having a two-layer structure of Example 1, Example 2, and Example 3 were performed.

The container of Example 1 was formed from a preform having a structure shown in FIG. 1 that includes an inner layer made of a PET virgin material (BK-2180, manufactured by Mitsubishi Chemical Co., Ltd.) and an outer layer made of a PET recycled material (LCG-1810, manufactured by Mexico Pet One Co., Ltd.). A weight ratio of the virgin material to a total weight was 38%, and a weight ratio of the recycled material to the total weight was 62%. A thickness of the inner layer in a body portion of the preform was 1.8 mm, and a thickness of the outer layer in the body portion of the preform was 2.98 mm.

The container of Example 2 was formed from a preform having a structure shown in FIG. 1 including an inner layer and an outer layer that are made of a blended material of a virgin material and a recycled material (a mixture of BK-2180 manufactured by Mitsubishi Chemical Co., Ltd. and LCG-1810 manufactured by Mexico Pet One Co., Ltd.), in which a proportion of the recycled material to a total weight was 30%. A weight ratio of the virgin material to the total weight was 70%. A thickness of the inner layer in a body portion of the preform was 1.8 mm, and a thickness of the outer layer in the body portion of the preform was 2.98 mm.

The container of Example 3 was formed from a preform having a structure shown in FIG. 1 including an inner layer and an outer layer that are made of a recycled material (LCG-1810, manufactured by Mexico Pet One Co., Ltd.). A thickness of the inner layer in a body portion of the preform was 1.8 mm, and a thickness of the outer layer in the body portion of the preform was 2.98 mm.

Hazes in the body portions of the containers of Examples 1 to 3 were measured using a haze meter (NDH-300, manufactured by Nippon Denshoku Industries Co., Ltd.). Average values calculated from values obtained by selecting and measuring 10 arbitrary portions of the body portions of the containers of Examples 1 to 3 were 1.74%, 1.75%, and 2.69%, respectively. When conversion was performed by setting the thickness of the body portion to 0.5 mm, values of the hazes in Examples 1 to 3 were respectively 1.36%, 1.49%, and 2.13%. It was found that in the containers of Examples 1 and 2, the hazes were lower than that of the container of Example 3 in which only the recycled material was used, and the transparency was good. In addition, it was found that the container of Example 1 exhibited a haze value equivalent to that of the container of Example 2 even though a use ratio of the recycle material in the container of Example 1 was higher than that of the container of Example 2, and that the container of Example 1 was excellent in transparency while having a high recycling rate.

The present invention is not limited to the above embodiment and may be modified or improved as appropriate. Materials, shapes, dimensions, numerical values, forms, numbers, arrangement places, and the like of components in the above embodiment are optional and not limited as long as the present invention can be achieved.

For example, although a mode is described in the above-described embodiment in which the virgin material and the recycled material use a PET resin as a base material, a material using a PE resin, a PP resin, or the like as a base material may be used. However, in the mode of the present embodiment, the PET resin is preferable.

Hereinafter, aspects extracted from the above-described embodiment and modifications thereof will be listed.

[1] A preform including:
an opening portion;
a body portion; and
a bottom portion, the preform having a two-layer structure in which the body portion and the bottom portion include an inner layer made of a virgin material and an outer layer made of a recycled material, in which a weight ratio of the recycled material to a total weight of the preform is 50% by weight or more, in which a ratio of a thickness of the outer layer to a thickness of the inner layer in the body portion is 1.5 or more, and in which a haze of a body portion of a container molded from the preform is 1.8% or less.

[2] The preform according to [1], in which a height of a gate mark of the inner layer in the bottom portion is smaller than a thickness of the outer layer in the bottom portion.

[3] A manufacturing method for manufacturing a preform, the preform including an opening portion, a body portion, and a bottom portion, and the preform having a two-layer structure in which the body portion and the bottom portion include an inner layer made of a virgin material and an outer layer made of a recycled material, the manufacturing method including:

a first injection molding process of injecting the virgin material or the recycled material into a first mold to injection mold an inner layer material or an outer layer material; and a second injection molding process of accommodating the inner layer material or the outer layer material molded in the first injection molding process in a second mold, and injecting the recycled material to an outer side of the inner layer material to injection mold an outer layer material or injecting the virgin material to an inner side of the outer layer material to injection mold an inner layer material, in which the inner layer material and the outer layer material are molded such that a weight ratio of the recycled material to a total weight of the preform is 50% by weight or more and a ratio of a thickness of the outer layer to a thickness of the inner layer in the body portion is 1.5 or more.

[4] The manufacturing method for manufacturing a preform according to [3], in which the first injection molding process is an inner layer material molding process of injecting the virgin material into the first mold to injection mold the inner layer material, and in which the second injection molding process is an outer layer material molding process of accommodating the inner layer material in the second mold, and injecting the recycled material to the outer side of the inner layer material to injection mold the outer layer material.

[5] The manufacturing method for manufacturing a preform according to [4], in which a length of a gate in the first mold from which the virgin material is injected is smaller than a thickness of the outer layer in the bottom portion of the preform.

[6] The manufacturing method for manufacturing a preform according to [3], in which the first injection molding process is an outer layer material molding process of injecting the recycled material into the first mold to injection mold the outer layer material, and in which the second injection molding process is an inner layer material molding process of accommodating the outer layer material in the second mold, and injecting the virgin material to the inner side of the outer layer material to injection mold the inner layer material.

[7] The manufacturing method for manufacturing a preform according to any one of [3] to [6], further including:

a cooling process of cooling the preform after the second injection molding process.

[8] The manufacturing method for manufacturing a preform according to [7], in which in the cooling process, the preform is accommodated in a cavity mold, an air introduction member is airtightly brought into contact with the preform, and the preform is cooled by sending air from an air-blowing port of the air introduction member into the preform and discharging the air from a discharge port of the air introduction member to an outside of the preform.

[9] The manufacturing method for manufacturing a preform according to [7], in which in the cooling process, the preform is cooled by sandwiching the preform between a cavity mold and a core mold.

[10] The manufacturing method for manufacturing a preform according to any one of [3] to [6], further including:

a first cooling process of cooling the inner layer material or the outer layer material after the first injection molding process; and a second cooling process of cooling the preform after the second injection molding process.

[11] The manufacturing method for manufacturing a preform according to [10], in which in the first cooling process and the second cooling process, the preform is accommodated in a cavity mold, an air introduction member is airtightly brought into contact with the preform, and the preform is cooled by sending air from an air-blowing port of the air introduction member into the preform and discharging the air from a discharge port of the air introduction member to an outside of the preform.

[12] The manufacturing method for manufacturing a preform according to [10], in which in the first cooling process and the second cooling process, the preform is cooled by sandwiching the preform between a cavity mold and a core mold.

[13] A resin-made container including:

an opening portion;

a body portion; and a bottom portion, the resin-made container having a two-layer structure in which the body portion and the bottom portion include an inner layer made of a virgin material and an outer layer made of a recycled material, in which a weight ratio of the recycled material to a total weight of the resin-made container is 50% by weight or more, in which a ratio of a thickness of the outer layer to a thickness of the inner layer in the body portion is 1.5 or more, and in which a haze of the body portion is 1.8% or less.

[14] A manufacturing method for manufacturing a resin-made container, the manufacturing method including:

an injection molding process of injection molding a preform, the preform including an opening portion, a body portion, and a bottom portion, and the preform having a two-layer structure in which the body portion and the bottom portion include an inner layer made of a virgin material and an outer layer made of a recycled material;

a temperature adjustment process of adjusting a temperature of the preform; and a blow molding process of blow molding the preform to mold a resin-made container, in which the injection molding process includes:
  a first injection molding process of injecting the virgin material or the recycled material into a first mold to injection mold an inner layer material or an outer layer material; and
  a second injection molding process of accommodating the inner layer material or the outer layer material molded in the first injection molding process in a second mold, and injecting the recycled material to an outer side of the inner layer material to injection mold an outer layer material or injecting the virgin material to an inner side of the outer layer material to injection mold an inner layer material, and
in which in the injection molding process, the inner layer material and the outer layer material are molded such that a weight ratio of the recycled material to a total weight of the preform is 50% by weight or more and a ratio of a thickness of the outer layer to a thickness of the inner layer in the body portion is 1.5 or more.

[15] The manufacturing method for manufacturing a resin-made container according to [14],
  in which the first injection molding process is an inner layer material molding process of injecting the virgin material into the first mold to injection mold the inner layer material, and
  in which the second injection molding process is an outer layer material molding process of accommodating the inner layer material in the second mold, and injecting the recycled material to the outer side of the inner layer material to injection mold the outer layer material.

[16] The manufacturing method for manufacturing a resin-made container according to [15],
  in which a length of a gate in the first mold from which the virgin material is injected is smaller than a thickness of the outer layer in the bottom portion of the preform.

[17] The manufacturing method for manufacturing a resin-made container according to [14],
  in which the first injection molding process is an outer layer material molding process of injecting the recycled material into the first mold to injection mold the outer layer material, and
  in which the second injection molding process is an inner layer material molding process of accommodating the outer layer material in the second mold, and injecting the virgin material to the inner side of the outer layer material to injection mold the inner layer material.

[18] The manufacturing method for manufacturing a resin-made container according to any one of [14] to [17],
  in which the preform molded in the injection molding process is cooled in the temperature adjustment process.

[19] The manufacturing method for manufacturing a resin-made container according to [18],
  in which in the temperature adjustment process,
    the preform is accommodated in a cavity mold,
    an air introduction member is airtightly brought into contact with the preform, and
    the preform is cooled by sending air from an air-blowing port of the air introduction member into the preform and discharging the air from a discharge port of the air introduction member to an outside of the preform.

[20] The manufacturing method for manufacturing a resin-made container according to [18],
  in which in the temperature adjustment process, the preform is cooled by sandwiching the preform between a cavity mold and a core mold.

[21] The manufacturing method for manufacturing a resin-made container according to any one of [14] to [17],
  in which the temperature adjustment process includes a first temperature adjustment process and a second temperature adjustment process,
  in which the first temperature adjustment process is a process of cooling the inner layer material or the outer layer material after the first injection molding process, and
  in which the second temperature adjustment process is a process of cooling the preform after the second injection molding process.

[22] The manufacturing method for manufacturing a resin-made container according to [21],
  in which in the first cooling process and the second cooling process,
    the preform is accommodated in a cavity mold,
    an air introduction member is airtightly brought into contact with the preform, and
    the preform is cooled by sending air from an air-blowing port of the air introduction member into the preform and discharging the air from a discharge port of the air introduction member to an outside of the preform.

[23] The manufacturing method for a resin-made container according to [21],
  in which in the first cooling process and the second cooling process, the preform is cooled by sandwiching the preform between a cavity mold and a core mold.

The present application is based on Japanese Patent Application No. 2019-109558 filed on Jun. 12, 2019, the entire contents of which are incorporated herein by reference. Further, all references cited here are entirely incorporated.

REFERENCE SIGNS LIST 10, 210: preform, 12: opening portion, 14: neck portion, 16: body portion, 18, 218: bottom portion, 22: inner layer, 24: outer layer, 22a, 24a: gate mark, 30: container, 36: body portion, 38: bottom portion, 42: inner layer, 44: outer layer, 50, 250: first mold, 52, 252: first cavity mold, 54, 254: first injection core mold, 55, 255: second injection core mold, 56, 256: neck mold, 58, 258: first gate, 59, 259: first hot runner mold, 59a, 259a: valve pin, 60, 260: inner layer material, 70, 270: second mold, 72, 272: second cavity mold, 78, 278: second gate, 79, 279: second hot runner mold, 80, 280: outer layer material, 282: opening portion, 100: third cavity mold, 110: air introduction member, 120: fourth cavity mold, 130: core mold, 150, 350: manufacturing device, 152: injection molding part, 154: temperature adjustment part, 156, 356: blow molding part, 158, 358: taking-out part, 352: first injection molding part, 353: second injection molding part, 354: first temperature adjustment part, 355: second temperature adjustment part, 362: first injection device, 363: second injection device, 370: conveying device

The invention claimed is:
1. A manufacturing method for manufacturing a preform, the preform including an opening portion, a body portion, and a bottom portion, and the preform having a two-layer structure in which the body portion and the bottom portion include an inner layer made of a virgin material and an outer layer made of a recycled material, the manufacturing method comprising:

a first injection molding process of injecting the virgin material or the recycled material into a first mold to injection mold an inner layer material or an outer layer material; and a second injection molding process of accommodating the inner layer material or the outer layer material molded in the first injection molding process in a second mold, and injecting the recycled material to an outer side of the inner layer material to injection mold an outer layer material or injecting the virgin material to an inner side of the outer layer material to injection mold an inner layer material, and a cooling process of accommodating the preform in a cavity mold different from the first mold and the second mold after the second injection molding process and cooling the preform accommodated in the cavity mold such that a haze of a body portion of a container molded from the preform is 1.8% or less, wherein the inner layer material and the outer layer material are molded such that a weight ratio of the recycled material to a total weight of the preform is 50% by weight or more and a ratio of a thickness of the outer layer to a thickness of the inner layer in the body portion is 1.5 or more.

2. The manufacturing method for manufacturing a preform according to claim 1,
wherein the first injection molding process is an inner layer material molding process of injecting the virgin material into the first mold to injection mold the inner layer material, and
wherein the second injection molding process is an outer layer material molding process of accommodating the inner layer material in the second mold, and injecting the recycled material to the outer side of the inner layer material to injection mold the outer layer material.

3. The manufacturing method for manufacturing a preform according to claim 2,
wherein a length of a gate in the first mold from which the virgin material is injected is smaller than a thickness of the outer layer in the bottom portion of the preform.

4. The manufacturing method for manufacturing a preform according to claim 1,
wherein the first injection molding process is an outer layer material molding process of injecting the recycled material into the first mold to injection mold the outer layer material, and
wherein the second injection molding process is an inner layer material molding process of accommodating the outer layer material in the second mold, and injecting the virgin material to the inner side of the outer layer material to injection mold the inner layer material.

5. The manufacturing method for manufacturing a preform according to claim 3,
wherein in the cooling process,
the preform is accommodated in the cavity mold,
an air introduction member is airtightly brought into contact with the preform, and
the preform is cooled by sending air from an air-blowing port of the air introduction member into the preform and discharging the air from a discharge port of the air introduction member to an outside of the preform.

6. The manufacturing method for manufacturing a preform according to claim 3,
wherein in the cooling process, the preform is cooled by sandwiching the preform between the cavity mold and a core mold.

7. The manufacturing method for manufacturing a preform according to claim 3, further comprising:
a first cooling process of cooling the inner layer material or the outer layer material after the first injection molding process and before the second injection molding process.

8. A manufacturing method for manufacturing a resin-made container, the manufacturing method comprising:
an injection molding process of injection molding a preform, the preform including an opening portion, a body portion, and a bottom portion, and the preform having a two-layer structure in which the body portion and the bottom portion include an inner layer made of a virgin material and an outer layer made of a recycled material;
a temperature adjustment process of adjusting a temperature of the preform; and
a blow molding process of blow molding the preform to mold a resin-made container,
wherein the injection molding process includes:
a first injection molding process of injecting the virgin material or the recycled material into a first mold to injection mold an inner layer material or an outer layer material; and
a second injection molding process of accommodating the inner layer material or the outer layer material molded in the first injection molding process in a second mold, and injecting the recycled material to an outer side of the inner layer material to injection mold an outer layer material or injecting the virgin material to an inner side of the outer layer material to injection mold an inner layer material, and
wherein in the injection molding process, the inner layer material and the outer layer material are molded such that a weight ratio of the recycled material to a total weight of the preform is 50% by weight or more and a ratio of a thickness of the outer layer to a thickness of the inner layer in the body portion is 1.5 or more, and
wherein the temperature adjustment process comprises accommodating the preform in a cavity mold different from the first mold and the second mold after the injection molding process and before the blow molding process and adjusting the temperature of the preform accommodated in the cavity mold such that a haze of a body portion of the resin-made container molded from the preform is 1.8% or less.

9. The manufacturing method for manufacturing a resin-made container according to claim 8,
wherein the first injection molding process is an inner layer material molding process of injecting the virgin material into the first mold to injection mold the inner layer material, and
wherein the second injection molding process is an outer layer material molding process of accommodating the inner layer material in the second mold, and injecting the recycled material to the outer side of the inner layer material to injection mold the outer layer material.

10. The manufacturing method for manufacturing a resin-made container according to claim 9,
wherein a length of a gate in the first mold from which the virgin material is injected is smaller than a thickness of the outer layer in the bottom portion of the preform.

11. The manufacturing method for manufacturing a resin-made container according to claim 8, wherein the first injection molding process is an outer layer material molding process of injecting the recycled material into the first mold to injection mold the outer layer material, and wherein the second injection molding process is an inner layer material molding process of accommodating the outer layer material in the second mold, and injecting the virgin material to the inner side of the outer layer material to injection mold the inner layer material.

12. The manufacturing method for manufacturing a resin-made container according to claim 8, wherein in the temperature adjustment process, the preform is accommodated in the cavity mold, an air introduction member is airtightly brought into contact with the preform, and the preform is cooled by sending air from an air-blowing port of the air introduction member into the preform and discharging the air from a discharge port of the air introduction member to an outside of the preform.

13. The manufacturing method for manufacturing a resin-made container according to claim 8, wherein in the temperature adjustment process, the preform is cooled by sandwiching the preform between the cavity mold and a core mold.

14. The manufacturing method for manufacturing a resin-made container according to claim 8, wherein the temperature adjustment process includes a first temperature adjustment process and a second temperature adjustment process, wherein the first temperature adjustment process is a process of cooling the inner layer material or the outer layer material after the first injection molding process and before the second injection molding process, and wherein the second temperature adjustment process is a process of cooling the preform after the second injection molding process.

* * * * *